United States Patent
Kim et al.

(10) Patent No.: US 8,941,786 B2
(45) Date of Patent: Jan. 27, 2015

(54) ELECTRICALLY-DRIVEN LIQUID CRYSTAL LENS AND STEREOSCOPIC DISPLAY DEVICE USING THE SAME

(75) Inventors: Sung Woo Kim, Gyeonggi-do (KR); Byung-Joo Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 531 days.

(21) Appl. No.: 12/956,113

(22) Filed: Nov. 30, 2010

(65) Prior Publication Data

US 2011/0292306 A1 Dec. 1, 2011

(30) Foreign Application Priority Data

Dec. 31, 2009 (KR) .................. 10-2009-0135686

(51) Int. Cl.
| | | |
|---|---|---|
| G02F 1/1335 | (2006.01) | |
| G02F 1/141 | (2006.01) | |
| H04N 13/04 | (2006.01) | |
| G02B 27/22 | (2006.01) | |
| G02F 1/1337 | (2006.01) | |
| G02F 1/29 | (2006.01) | |

(52) U.S. Cl.
CPC ........ *H04N 13/0404* (2013.01); *G02B 27/2214* (2013.01); *G02F 1/133784* (2013.01); *G02F 2001/294* (2013.01); *G02F 2203/28* (2013.01)
USPC ........................................... 349/15; 349/136

(58) Field of Classification Search
CPC ........ G02F 2001/133746; G02F 2011/133749; G02F 2203/28; G02B 27/2214
USPC ....................... 349/200, 13, 15, 136
See application file for complete search history.

(56) References Cited

U.S. PATENT DOCUMENTS

| | | | |
|---|---|---|---|
| 2007/0115417 A1* | 5/2007 | Ge et al. ........................ | 349/141 |
| 2008/0259258 A1* | 10/2008 | Hashimoto et al. ........... | 349/113 |
| 2009/0153754 A1* | 6/2009 | Jung .............................. | 349/15 |

FOREIGN PATENT DOCUMENTS

CN 101464578 6/2009

OTHER PUBLICATIONS

Office Action and English translation dated May 24, 2013 issued by the Chinese Patent Office for Chinese Patent Application No. 201010273970.0.

* cited by examiner

*Primary Examiner* — Jessica M Merlin
(74) *Attorney, Agent, or Firm* — Morgan, Lewis & Bockius LLP

(57) ABSTRACT

Disclosed are an electrically-driven liquid crystal lens in which a rubbing direction is defined in a range of 30~90 degrees with respect to a longitudinal direction of an electrode, achieving an improved lens profile and lens symmetry, and a stereoscopic display device using the same.

8 Claims, 8 Drawing Sheets

US 8,941,786 B2

ELECTRICALLY-DRIVEN LIQUID CRYSTAL LENS AND STEREOSCOPIC DISPLAY DEVICE USING THE SAME

This application claims the benefit of the Korean Patent Application No. 10-2009-0135686, filed on Dec. 31, 2009, which is hereby incorporated by reference as if fully set forth herein.

BACKGROUND OF THE INVENTION

1. Field of the Invention

The present invention relates to an electrically-driven liquid crystal lens, and more particularly, to an electrically-driven liquid crystal lens in which a rubbing direction is defined in a range of 30~90 degrees with respect to a longitudinal direction of an electrode, achieving an improved lens profile and lens symmetry, and a stereoscopic display device using the same.

2. Discussion of the Related Art

At present, services for rapid dissemination of information, to be constructed based on high-speed information communication networks, have developed from a simple "listening and speaking" service, such as current telephones, to a "watching and listening" multimedia type service based on digital terminals used for high-speed processing of characters, voices and images, and are expected to be ultimately developed into hyperspace 3-dimensional stereoscopic information communication services enabling virtual reality and stereoscopic viewing free from the restrains of time and space.

In general, stereoscopic images representing 3-dimensions are realized based on the principle of stereo-vision via the viewer's eyes. However, since the viewer's eyes are spaced apart from each other by about 65 mm, i.e. have a binocular parallax, the left and right eyes perceive slightly different images due to a positional difference between the two eyes. Such an image difference due to the positional difference between the two eyes is called binocular disparity. A 3-dimensional stereoscopic image display device is designed based on binocular disparity, allowing the left eye to view only an image for the left eye and the right eye to view only an image for the right eye.

Specifically, the left and right eyes view different 2-dimensional images, respectively. If the two different images are transmitted to the brain through the retina, the brain accurately combines the images, reproducing depth perception and realism of an original 3-dimensional (3D) image. This ability is conventionally referred to as stereography (stereoscopy), and a display device to which stereoscopy is applied is referred to as a stereoscopic display device.

In the meantime, stereoscopic display devices may be classified based on constituent elements of a lens which realizes 3-dimensional images. In one example, a lens using a liquid crystal layer is referred to as an electrically-driven liquid crystal lens.

Generally, a liquid crystal display device includes two electrodes opposite each other, and a liquid crystal layer interposed between the two electrodes. Liquid crystal molecules of the liquid crystal layer are driven by an electric field created when voltages are applied to the two electrodes. The liquid crystal molecules have polarization and optical anisotropy characteristics. Here, polarization refers to a change in molecular arrangement direction according an electric field, which is caused as electrons in liquid crystal molecules are gathered to opposite sides of the liquid crystal molecules when the liquid crystal molecules are under the influence of an electric field. Also, optical anisotropy refers to a change in path or polarization of light to be emitted according to an incidence direction or polarization of incident light, which is caused by an elongated shape of liquid crystal molecules and the above-mentioned molecular arrangement direction.

Accordingly, the liquid crystal layer has a transmittance difference due to voltages applied to the two electrodes, and is able to display an image by varying the transmittance difference on a per pixel basis.

Recently, there has been proposed an electrically-driven liquid crystal lens in which a liquid crystal layer serves as a lens based on the above-described characteristics of liquid crystal molecules.

Specifically, a lens is designed to control a path of incident light on a per position basis using a difference between a refractive index of a lens constituent material and a refractive index of air. In the electrically-driven liquid crystal lens, if different voltages are applied to electrodes located at different positions of the liquid crystal layer so as to create an electric field required to drive the liquid crystal layer, incident light introduced into the liquid crystal layer undergoes different phase variations on a per position basis, and as a result, the liquid crystal layer is able to control the path of the incident light in the same manner as an actual lens.

Hereinafter, an electrically-driven liquid crystal lens of related art will be described with reference to the accompanying drawings.

FIG. 1 is a sectional view illustrating an electrically-driven liquid crystal lens of related art, and FIG. 2 is a schematic view illustrating a potential distribution of the electrically-driven liquid crystal lens of FIG. 1 after voltage is applied to the electrically-driven liquid crystal lens.

As illustrated in FIG. 1, the electrically-driven liquid crystal lens of related art includes first and second substrates 10 and 20 opposite each other, and a liquid crystal layer 30 formed between the first substrate 10 and the second substrate 20.

First electrodes 11 are arranged on the first substrate 10 and are spaced apart from one another by a first distance. In the two neighboring first electrodes 11, a distance from the center of one first electrode 11 to the center of the other first electrode 11 is referred to as a "pitch". Repeating the same pitch for the respective first electrodes results in a pattern.

A second electrode 21 is formed over the entire surface of the second substrate 20 opposite the first substrate 10.

The first and second electrodes 11 and 21 are made of transparent metal. The liquid crystal layer 30 is formed in a space between the first electrodes 11 and the second electrode 21. Liquid crystal molecules of the liquid crystal layer 30 have a parabolic potential surface due to a property reacting according to the intensity and distribution of an electric field and thus, have a phase distribution similar to that of the electrically-driven liquid crystal lens as illustrated in FIG. 2.

The above-described electrically-driven liquid crystal lens is realized under the condition that high voltages are applied to the first electrode 11 and the second electrode 21 is grounded. With this voltage condition, a vertical electric field is strongest at the center of the first electrode 11, and the intensity of the vertical electric field decreases away from the first electrode 11. Accordingly, if the liquid crystal molecules of the liquid crystal layer 30 have positive dielectric constant anisotropy, the liquid crystal molecules are arranged according to the electric field in such a way that the liquid crystal molecules are upright at the center of the first electrode 11 and are gradually tilted approximately horizontally away from the first electrode 11. As a result, in view of light transmission, an optical path is shortened at the center of the first electrode 11, and is lengthened with increasing distance from the first electrode 11, as illustrated in FIG. 2. Representing the length variation of the optical path using a phase plane, the electrically-driven liquid crystal lens has light transmission effects similar to a lens having a parabolic surface.

Here, the second electrode 21 causes behavior of the electric field created by the liquid crystal molecules, making a refractive index of light spatially take the form of a parabolic function. The first electrode 11 corresponds to a lens edge region.

In this case, relatively high voltages are applied to the first electrodes 11 than the second electrode 21. Therefore, as illustrated in FIG. 2, an electric potential difference occurs between the first electrodes 11 and the second electrode 21. In particular, a steep lateral electric field is created around the first electrodes 11. Accordingly, liquid crystals have a slightly distorted distribution rather than a gentle distribution, whereby a refractive index of light cannot exhibit parabolic spatial distribution, or movement of the liquid crystals is excessively sensitive to voltage variation.

The above-described electrically-driven liquid crystal lens of the related art may be realized, without a lens having a parabolic surface, by arranging electrodes on two substrates with liquid crystals interposed therebetween and applying voltages to the electrodes.

The above described electrically-driven liquid crystal lens has the following problems.

Firstly, since the electrodes formed on the lower substrate are positioned at only a part of a lens region, a steep lateral electric field, rather than a gentle electric field, is created between a lens edge region corresponding to the electrode and a lens center region distant from the lens edge region, resulting in a slightly distorted phase of the electrically-driven liquid crystal lens. In particular, in the electrically-driven liquid crystal lens that is driven by a liquid crystal field, since the greater the pitch of lens regions, the smaller the number of electrodes to which high voltages are applied, an insufficient electric field is created between the high voltage electrodes and a substrate opposite these electrodes. Accordingly, it becomes difficult to form the electrically-driven liquid crystal lens having a gentle parabolic lens surface, which has the same effects as an actual lens.

Secondly, when being applied to a large-area display device, the lens center region, which is distant from the lens edge region where the electrode, to which high-voltage is applied, is located, is substantially unaffected by an electric field and has a difficulty in alignment control of liquid crystals by the electric field. As occasion demands, if the alignment control in the lens center region is difficult or impossible, the resulting electrically-driven liquid crystal lens has a discontinuous lens profile and is ineffective as a lens.

Thirdly, in the electrically-driven liquid crystal lens of the related art, to solve the above described problems, there has been attempted a method in which a lens region of one substrate is provided with finely split electrodes and different voltages are applied to the respective electrodes. However, the method may create a horizontal electric field between the neighboring electrodes, and the horizontal electric field may cause distortion in alignment of liquid crystal molecules of a liquid crystal layer that are driven by a vertical electric field to form a liquid crystal lens. Since this distortion acts as a lens error and results in asymmetry in the liquid crystal lens, an effort to solve this problem has been proposed.

SUMMARY OF THE INVENTION

Accordingly, the present invention is directed to an electrically-driven liquid crystal lens and a stereoscopic display device using the same that substantially obviate one or more problems due to limitations and disadvantages of the related art.

An object of the present invention is to provide an electrically-driven liquid crystal lens in which a rubbing direction is defined in a range of 30~90 degrees with respect to a longitudinal direction of an electrode, achieving an improved lens profile and lens symmetry, and a stereoscopic display device using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an electrically-driven liquid crystal lens includes a first substrate and a second substrate arranged opposite each other and each including a plurality of lens regions, a plurality of first electrodes formed on the first substrate in each lens region and spaced apart from one another in a given direction, voltages gradually increasing from a center to an edge of each lens region being applied to the respective first electrodes, a second electrode formed over the entire surface of the second substrate, a first alignment film formed over the entire surface of the first substrate including the first electrodes, the first alignment film being subjected to rubbing by an angle of 30~90 degrees with respect to a longitudinal direction of the first electrodes and being aligned to have a pretilt angle, and a liquid crystal layer filled between the first substrate and the second substrate.

The pretilt angle of the first alignment film may be in a range of 4~45 degrees.

The pretilt angle of the first alignment film may be in a range of 0~0.5 degrees.

Liquid crystals forming the liquid crystal layer may have positive dielectric anisotropy.

The electrically-driven liquid crystal lens may further include a second alignment film on the second electrode. The second alignment film may have a rubbing direction antiparallel to a rubbing direction of the first alignment film.

In accordance with another aspect of the present invention, a stereoscopic display device includes the above described electrically-driven liquid crystal lens and a display panel to emit a 2-dimensional (2D) image signal.

A transmission axis of polarized light may be identical to a rubbing direction of the first alignment film included in the electrically-driven liquid crystal lens when the polarized light is transmitted from the display panel to the electrically-driven liquid crystal lens.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to an electrically-driven liquid crystal lens and a stereoscopic display device using the same according to the preferred embodiments of the present invention, examples of which are illustrated in the accompanying drawings. Wherever possible, the same reference numbers will be used throughout the drawings to refer to the same or like parts.

The present invention proposes a configuration of an electrically-driven liquid crystal lens in which each lens region is provided with finely split electrodes and different voltages are applied to the respective electrodes because an electrically-driven liquid crystal lens having a single electrode in each lens region is difficult to control a fine lens profile.

In the proposed configuration, a lower substrate is provided with first finely split electrodes, and an upper substrate is provided over the entire surface thereof with a second electrode, such that the electrically-driven liquid crystal lens is driven by a vertical electric field created between the first electrodes and the second electrode.

In addition, the present invention proposes that the lower substrate provided with the first finely split electrodes is subjected to rubbing in a direction parallel to a longitudinal direction of the electrodes.

Hereinafter, alignment characteristics of liquid crystals appearing in the above described configuration will be described.

Figure 1:
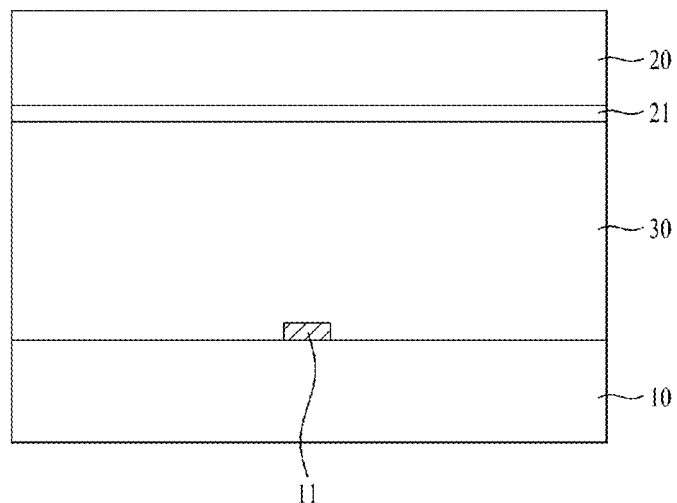
FIG. 1 is a sectional view illustrating a electrically-driven liquid crystal lens of the related art.
Figure 2:
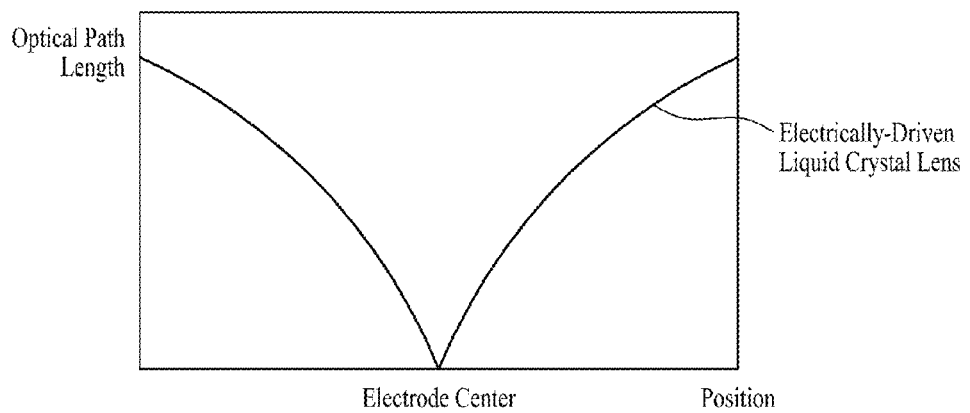
FIG. 2 is a view illustrating a potential distribution after voltage is applied to the electrically-driven liquid crystal lens of FIG. 1.
Figure 3A:
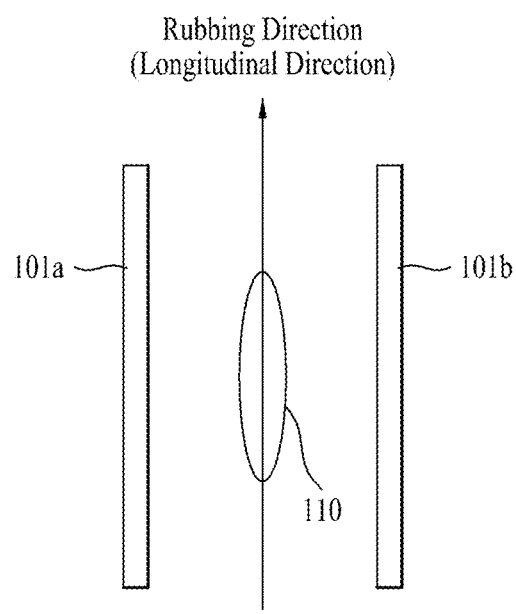
FIGS. 3A and 3B are views illustrating alignment of liquid crystals, respectively, when no voltage is applied to electrodes and when voltage is applied to electrodes under the assumption that rubbing is performed in a direction parallel to electrodes.
Figure 3B:
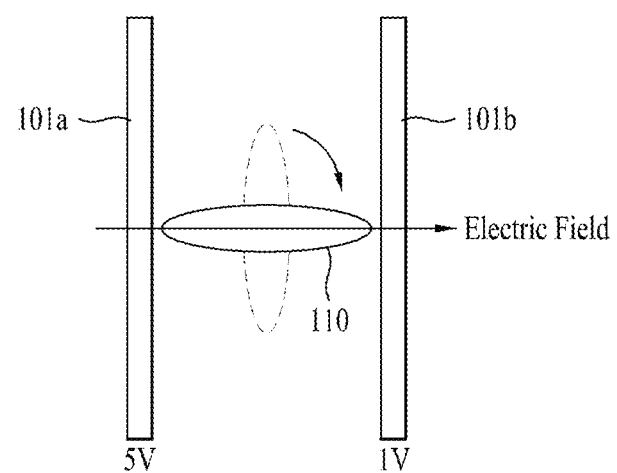

FIGS. 3A and 3B are views illustrating alignment of liquid crystals, respectively, when no voltage is applied to the electrodes and when voltage is applied to the electrodes under the assumption that rubbing is performed in a direction parallel to the longitudinal direction of the electrodes.

In a finely split electrode configuration, if rubbing is performed in a direction parallel to a longitudinal direction of first finely split electrodes 101a and 101b as illustrated in FIG. 3A, liquid crystal molecules 110 are aligned in the rubbing direction parallel to the first finely split electrodes 101a and 101b in an initial state in which no voltage is applied.

Then, when voltages are applied to the first finely split electrodes and a second electrode of the electrically-driven liquid crystal lens, a vertical electric field is created between the first electrodes and the second electrode, and thus, an electric field to drive liquid crystals is created by a difference in refractive indices of the liquid crystals aligned in different phase surfaces.

In the meantime, when voltages are applied to the first finely split electrodes 101a and 101b as illustrated in FIG. 3B, a horizontal electric field is created by the first finely split electrodes 101a and 101b and also, due to a voltage difference between the first finely split electrodes 101a and 101b. When the lower substrate is strongly affected by the horizontal electric field in addition to the vertical electric field for lens driving, this causes horizontal distortion of liquid crystal molecules, making it impossible the resulting lens to function normally.

In particular, the voltages applied to the first finely split electrodes 101a and 101b formed on the lower substrate may be high voltages suitable to reduce a cell gap of a liquid crystal layer. For example, if it is assumed that the voltages applied respectively to the neighboring first finely split electrodes 101a and 101b are 5V and 1V, a horizontal electric field is created between the two neighboring electrodes. Thereby, the liquid crystal molecules 110, which have been aligned in the longitudinal direction of the electrodes in a state in which no voltage is applied to the electrodes, may be distorted to follow a direction of the horizontal electric field and consequently, may be aligned in a crosswise direction of the electrodes 101a and 101b. This phenomenon occurs more intensely in liquid crystal molecules 110 close to the lower substrate provided with the first finely split electrodes 101a and 101b.

This problem occurs because the horizontal electric field, created when voltage is applied, has a greater effect on the liquid crystal molecules 110 than force exhibited by an initial pretilt angle of the liquid crystal molecules 110, thereby causing the liquid crystal molecules 110 to be distorted in a horizontal direction.

Therefore, it has been attempted to reduce the effect of the horizontal electric field between the first finely split electrodes on the lower substrate by making liquid crystal alignment, in the initial state in which no voltage is applied, be equal to liquid crystal alignment when voltage is applied. To this end, some experiments were performed to observe liquid crystal alignment under the condition that rubbing is performed in a direction perpendicular to a longitudinal direction of electrodes and thus, a pretilt angle of liquid crystal molecules is changed.

Figure 4:
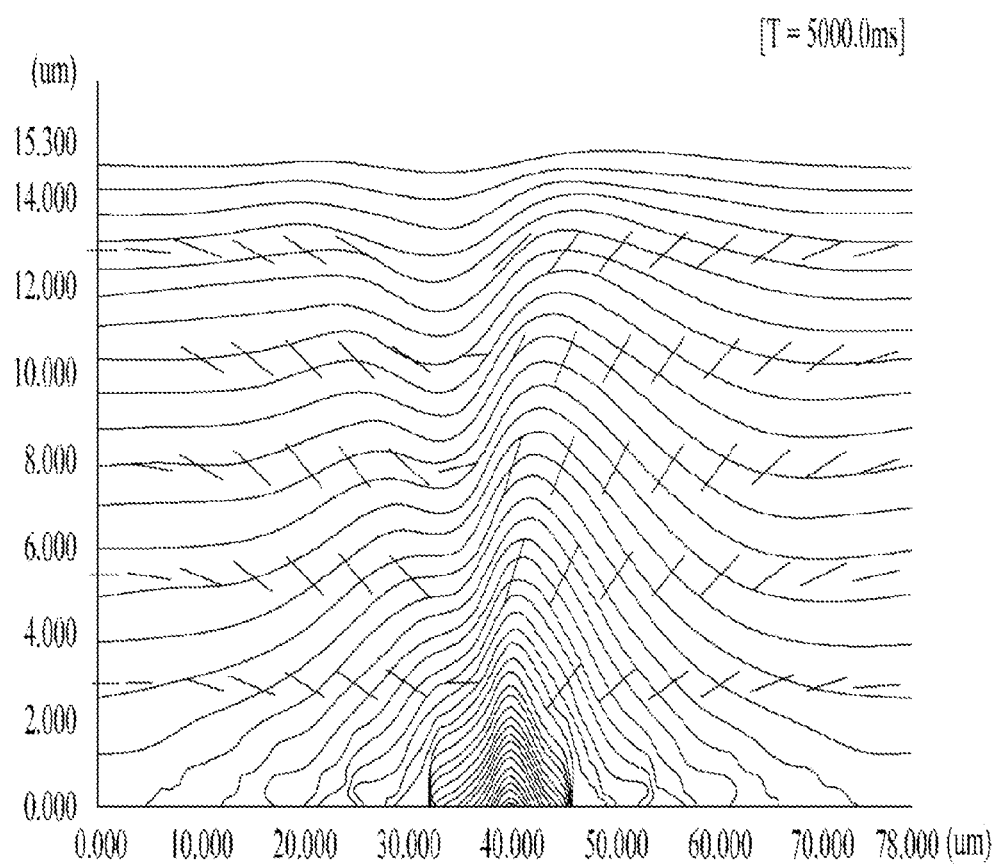
FIG. 4 is a view illustrating equipotential surfaces and liquid crystal alignment under the condition that a pretilt angle is 1 degree during rubbing in a direction perpendicular to electrodes.
Figure 5:
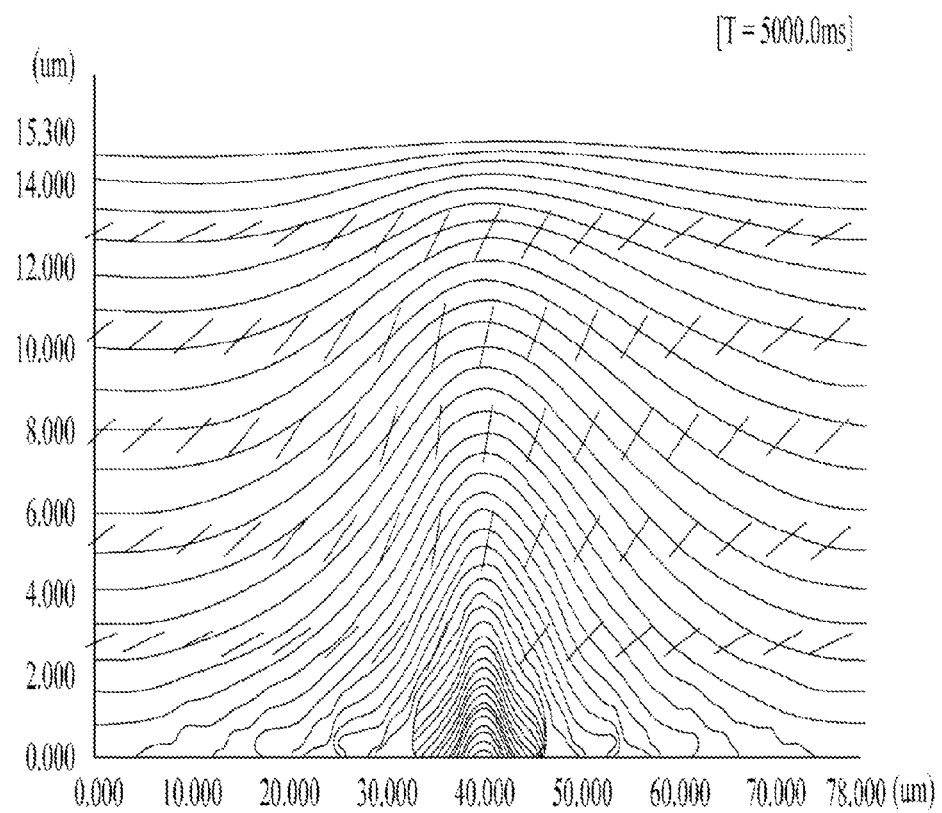
FIG. 5 is a view illustrating equipotential surfaces and liquid crystal alignment under the condition that a pretilt angle is 4 degrees during rubbing in a direction perpendicular to electrodes.

FIG. 4 is a view illustrating equipotential surfaces and liquid crystal alignment under the condition that a pretilt angle is 1 degree when rubbing is performed in a direction perpendicular to a longitudinal direction of an electrode, and FIG. 5 is a view illustrating equipotential surfaces and liquid crystal alignment under the condition that a pretilt angle is 4 degrees when rubbing is performed in a direction perpendicular to the longitudinal direction of the electrode.

When rubbing is performed in a direction perpendicular to the longitudinal direction of the electrode, liquid crystals exhibit different alignment characteristics according to a pretilt angle thereof. In particular, as illustrated in FIG. 4, if the pretilt angle has a small value of 1 degree, the effect of an electric field is greater than the effect of a pretilt angle and therefore, liquid crystal molecules have symmetric alignment at opposite sides of an approximately centrally located electrode to which a high voltage is applied. However, in a region where liquid crystal molecules are aligned in a direction different from the direction of a pretilt angle (the left region of the drawing), a strong horizontal electric field is created between the center of an electrode to which the highest voltage is applied and a neighboring electrode, causing the liquid crystals to be tilted horizontally.

Specifically, when voltage is applied to the electrode in the direction of a pretilt angle, liquid crystals are normally aligned in a direction parallel to a potential surface, but may be aligned in a direction perpendicular to the potential surface in an opposite direction of the pretilt angle. In particular, liquid crystals at the center of the electrode remain to be driven by a horizontal electric field and thus, symmetry of the electrically-driven liquid crystal lens is broken.

On the other hand, as illustrated in FIG. 5, if the pretilt angle has a large value of about 4 degrees, the effect of a pretilt angle is greater than the effect of an electric field. Therefore, liquid crystals are aligned in a direction substantially perpendicular to the potential surface when voltage is applied, and alignment of the liquid crystals is maintained based on an initial pretilt angle of the liquid crystals. As a result, liquid crystal molecules are aligned in approximately the same direction as the pretilt angle, rather than being symmetrically aligned on the basis of the center of the electrode.

Specifically, in the case of FIG. 5, the alignment direction of liquid crystal molecules is approximately equal to the direction of a pretilt angle and thus, the liquid crystal molecules are aligned in a direction perpendicular to the potential surface. Accordingly, differently from FIG. 4, the liquid crystal molecules are asymmetrically aligned on the basis of the center of the electrode to which the highest voltage is applied.

However, upon driving of the electrically-driven liquid crystal lens, a liquid crystal layer does not have an actual lens shape, but realizes a lens functions as each lens region defines a parabolic optical path difference due to a difference in refractive indices of liquid crystal molecules. Here, it can be said that the optical path difference is determined according to a tilt degree of liquid crystal molecules.

As compared to FIG. 4, it can be appreciated that, when the pretilt angle is increased to about 4 degrees as illustrated in FIG. 5, a phenomenon wherein liquid crystal molecules are tilted completely horizontally around the center of the electrode can be eliminated.

If the pretilt angle is increased to about 4 degrees as illustrated in FIG. 5, although the electrically-driven liquid crystal lens may have asymmetrical alignment characteristics, the effect of a vertical electric field is increased by the pretilt angle such that the liquid crystals undergo a symmetrical refractive index difference, thus following the condition of vertical alignment. Owing to the symmetrical refractive index difference of the liquid crystal layer on the basis of the electrode to which the highest voltage is applied, the electrically-driven liquid crystal lens exhibits a symmetrical liquid crystal alignment under the condition that rubbing is performed in a direction perpendicular to the longitudinal direction of the electrode and the pretilt angle has a value in the range of 4~45 degrees.

When the pretilt angle is 4 degrees as illustrated in FIG. 5, the liquid crystal molecules have the same alignment direction and also, the same tilt degree on the basis of the center of the electrode, thereby allowing the electrically-driven liquid crystal lens to perform symmetric operation about the electrode.

As will be appreciated from the above described experiments, if rubbing is performed in a direction perpendicular to the longitudinal direction of the electrode and an initial pretilt angle is set to a large value of about 4 degrees or more so as to increase the effect of a pretilt angle beyond the effect of an electric field, it is possible to prevent the liquid crystals from being distorted by a horizontal electric field of the lower substrate of the electrically-driven liquid crystal lens.

Figure 6:
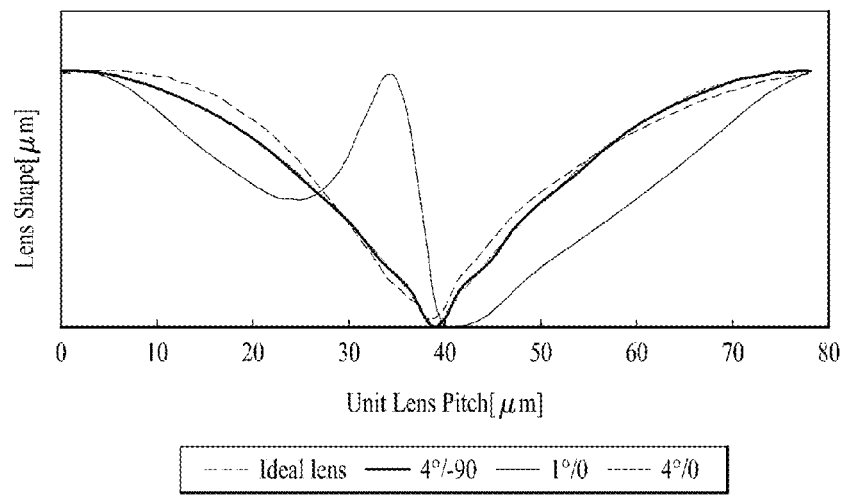
FIG. 6 is a view illustrating a lens shape based on rubbing and pretilt angles.

FIG. 6 is a view illustrating a lens shape based on rubbing and pretilt angles.

FIG. 6 illustrates different shapes of the electrically-driven liquid crystal lens based on different cases Nos. 1 to 4. Here, case No. 1 assumes an ideal lens, case No. 2 assumes that the rubbing angle is 90 degrees and the pretilt angle is 4 degrees, case No. 3 assumes that the rubbing angle is zero degrees and the pretilt angle is 1 degree, and case No. 4 assumes that the rubbing angle is zero degrees and the pretilt angle is 4 degrees.

In particular, in case No. 3 that the rubbing angle is zero degrees (parallel to the longitudinal direction of the electrode) and the pretilt angle is 1 degree, it can be appreciated that symmetry of the electrically-driven liquid crystal lens is broken and the electrically-driven liquid crystal lens cannot be driven normally. This is, as described above, because the liquid crystal molecules are distorted horizontally when voltage is applied.

In case No. 4, although symmetry of the electrically-driven liquid crystal lens is not completely broken in a region adjacent to the center of the electrode as compared to case No. 3, the left and right sides may have different shapes. That is, it can be appreciated that, when rubbing is performed in a direction parallel to the longitudinal direction of the electrode, the electrically-driven liquid crystal lens does not have an ideal lens shape even if the pretilt angle has a large value.

On the contrary, in case No. 2 that the rubbing angle is 90 degrees and thus, rubbing is performed in a direction perpendicular to the longitudinal direction of the electrode and the pretilt angle is 4 degrees, it can be appreciated that the electrically-driven liquid crystal lens may be operated as a horizontally symmetrical lens substantially in the same manner as an ideal lens. Through this case, when the rubbing angle is 90 degrees and the pretilt angle is in the range of 4~45 degrees, it can be appreciated that the electrically-driven liquid crystal lens by operated as an ideal lens.

Figure 7:
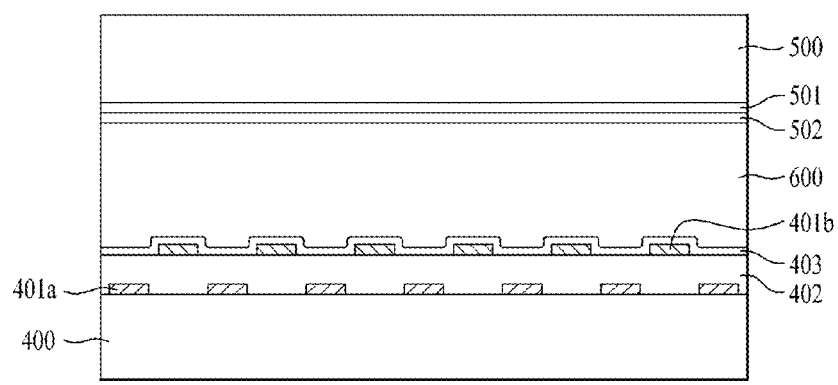
FIG. 7 is a sectional view illustrating an electrically-driven liquid crystal lens according to the present invention.

FIG. 7 is a sectional view illustrating the electrically-driven liquid crystal lens of the present invention.

As illustrated in FIG. 7, the electrically-driven liquid crystal lens of the present invention includes a first substrate 400 and a second substrate 500 arranged opposite each other and each a plurality of lens regions L to correspond to those of the other substrate, a plurality of first electrodes 401a and 401b formed on the first substrate 400 and equidistantly spaced apart from one another in each lens region, a second electrode 501 formed over the entire surface of the second substrate 500, a voltage source to apply different voltages Vmin, V1, V2, ... Vmax to the respective first electrodes 401a and 401b, and a liquid crystal layer 600 filled between the first substrate 400 and the second substrate 500.

A single electrically-driven liquid crystal lens contains periodically repeated lens regions L having an optical path difference.

The first electrodes 401a and 401b may be equidistantly spaced apart from one another as illustrated, or as occasion demands, may have a variable interval gradually increasing or decreasing from the edge E to the center O of the lens region L.

The first electrodes 401a and 401b and the second electrode 501 are made of transparent metal, to prevent transmittance loss at locations where the respective electrodes are located.

The first electrodes 401a and 401b may be spaced apart from one another in a single layer, or may be divided in different layers such that the first electrodes 401a are arranged on the first substrate 400 and the first electrodes 401b are arranged on an insulating film 402 as illustrated. In the latter case, the first electrodes 401a or 401b in the same layer may be spaced apart from one another by an increased distance, to prevent short-circuit between the neighboring first electrodes 401a or 401b having a small width. Furthermore, from the viewpoint of the plane, all the first electrodes 401a and 401b may be densely arranged to cover substantially the entire surface of the first substrate 400.

With respect to each lens region L, a first voltage Vmin, which is approximately equal to a threshold voltage, is applied to the first electrode located at the center O of the lens region L, whereas the highest $n^{th}$ voltage Vmax is applied to the first electrode located at the edge E of the lens region L. In this case, voltages applied to the first electrodes 401a and 401b, located between the center O and the edge E of the lens region L, range from the threshold voltage Vmin to the $n^{th}$ voltage Vmax of the lens region L, and gradually increase with increasing distance from the center O of the lens region L. When the voltages are applied to the plurality of first electrodes 401a and 401b, a ground voltage is applied to the second electrode 501, whereby a vertical electric field is created between the first electrodes 401a and 401b and the second electrode 501.

Upon the above described voltage application, it is desirable that a difference in the voltages applied to the neighboring first electrodes 401a and 401b be 1V or less, so as not to create an excessively strong horizontal electric field between the first electrodes 401a and 401b.

The plurality of first electrodes 401a and 401b are horizontally symmetrically formed about the edge E of the lens region L. The respective first electrodes 401a and 401b are connected to the voltage source of the corresponding voltage signals Vmin, V1, V2, . . . Vmax via metal lines (not shown) in a pad portion (corresponding to a non-display portion of the display panel 350), such that corresponding voltages are applied to the first electrodes 401a and 401b.

Here, the lowest threshold voltage Vmin applied to the first electrode 401a or 401b corresponding to the center O of the lens region L is an Alternating Current (AC) square wave voltage having a peak value of about 1.4~2V. The threshold voltage Vmin is given by $$V = \pi\sqrt{\frac{K1}{\Delta\varepsilon\varepsilon 0}}$$

(where, $\Delta\in$ is the dielectric constant anisotropy of liquid crystals, K1 is the modulus of elasticity of liquid crystals, and $\in_0$ is a free-space dielectric constant). In addition, the highest voltage Vmax of the voltages applied to the first electrodes 51, i.e. the voltage applied to the first electrodes 401a and 401b positioned at the edge E of the lens region L is an AC square wave voltage having a peak value of about 2.5~10V.

If it is assumed that the width of the lens region L is a pitch P, a distance between the center O and the edge E of the lens region L is equal to P/2. This means that symmetrical values of voltages are applied to the symmetrical first electrodes 401a and 401b from the edge E to the center O of the lens region L.

The first alignment film 403 and the second alignment film 502 are formed, respectively, on the first substrate 400 including the first electrodes 401a and 401b and on the second electrode 501. In this case, to allow the electrically-driven liquid crystal lens to function as a transparent layer in an initial state in which no voltage is applied thereto, the first alignment film 403 may have a rubbing direction perpendicular to a longitudinal direction of the first electrodes 401a and 401b or in a range of 30~90 degrees with respect to the longitudinal direction of the first electrodes 401a and 401b. In this case, the second alignment film 502 has a rubbing direction crossing or anti-parallel to the rubbing direction of the first alignment film 403 (here, the term "anti-parallel" means a parallel direction having an opposite traveling direction). Thereby, the electrically-driven liquid crystal lens may directly pass an image, transmitted from the display panel located therebelow, to the viewer.

The plurality of first electrodes 401a and 401b has a bar shape extending in a crosswise direction of the first substrate 400 or the insulating film 402 (i.e. a direction of one side of the first substrate 400). Each of the first electrodes 401a and 401b has a width of 1~10 μM, and a distance between the two neighboring first electrodes 401a and 401b is in a range of 1-10 μm. For example, the pitch is variously variable in a range of 90 μm to 1,000 μm and, approximately ten to one hundred or more first electrodes may be formed on a per lens region basis according to the above described width and distance of the first electrodes 401a and 401b.

Although not shown, a seal pattern (not shown) is formed at an outer peripheral region of the first and second substrates 400 and 500 (i.e. a non-display region including a pad portion) to support a gap between the first substrate 400 and the second substrate 500. The liquid crystal layer 600 between the first substrate 400 and the second substrate 500 must have a sufficient thickness equal to about 15 μm or more, in order to form a sufficient phase of the electrically-driven liquid crystal lens. To stably maintain the thickness of the liquid crystal layer 600, ball spacers or column spacers may be further provided to support a cell gap between the first substrate 400 and the second substrate 500. In this case, it is advantageous to position the spacers so as not to distort the phase of the electrically-driven liquid crystal lens.

As the first electrodes 401a and 401b having the same width are arranged on the first substrate 400 and the voltages gradually decreasing from the edge E to the center O of the lens region L are applied to the first electrodes 401a and 401b, a gentle vertical electric field is created between the first electrodes 401a and 401b and the second electrode 501 and a slight horizontal electric field is created between the neighboring first electrodes 401a and 401b. Consequently, a gentle lateral electric field may be observed, in which the intensity of the electric field is high at the edge E of the lens region L and is low at the center O of the lens region L.

Representing the length of optical paths of liquid crystals aligned on a per position basis of an electric field, the edge E of the lens region L has the shortest optical path, and the center O of the lens region L has the longest optical path. Accordingly, it can be appreciated that the electrically-driven liquid crystal lens has a shape similar to a gentle parabolic lens.

Here, the voltages applied to the first electrodes 401a and 401b and the second electrode 501 causes behavior of the electric field created by the liquid crystal molecules, making a refractive index of light spatially take the form of a parabolic function.

The first electrodes 401a and 401b may be divided into two layers as illustrated, or may be formed in the same layer. Also, the width and distance of the first electrodes 401a and 401b may have equal values, or one of the width and distance may have an unequal value, or both the width and the distance may have unequal values. Changes in the width and distance of the first electrodes may depend on a desired lens profile.

Figure 8A:
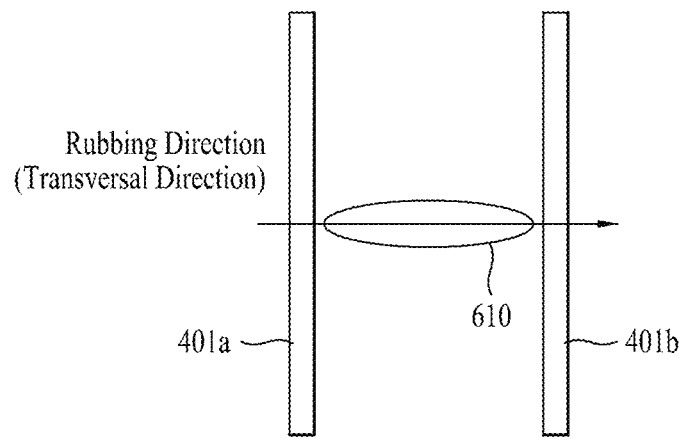
FIGS. 8A and 8B are views illustrating liquid crystal alignment, respectively, when no voltage is applied to neighboring electrodes of FIG. 7 and when voltage is applied to the electrodes.
Figure 8B:
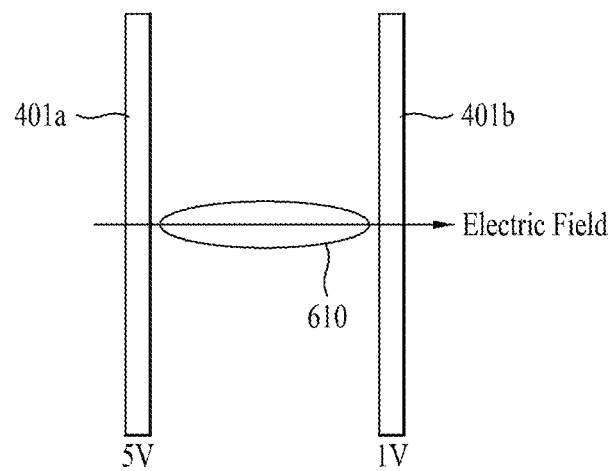

FIGS. 8A and 8B are views illustrating liquid crystal alignment, respectively, when no voltage is applied to neighboring electrodes of FIG. 7 and when voltage is applied to the electrodes.

As illustrated in FIG. 8A, when no voltage is applied, liquid crystal molecules 610 between the first electrodes 401a and 401b are aligned in an initial rubbing direction.

As illustrated in FIG. 8B, when voltage is applied, for example, when voltages applied to the neighboring first electrodes 401a and 401b are 5V and 1V respectively, even though a horizontal electric field is created between the neighboring electrodes 401a and 401b, the liquid crystal molecules 610 maintain an initial alignment direction because the horizontal electric field has the same direction as the initial alignment direction. This prevents distortion of the liquid crystal molecules 610 close to the first substrate 400 to which a high voltage is applied, thereby eliminating any effects due to the horizontal electric field of the first substrate 400. In addition, the liquid crystal layer 600 may be driven normally by a vertical electric field created between the first and second substrates 400 and 500.

As described above, in the electrically-driven liquid crystal lens of the present invention, the first alignment film 403 formed above the first electrodes 401a and 401b is subjected to rubbing in a direction perpendicular to a longitudinal direction of the first electrodes 401a and 401b, so as to eliminate any effects due to the horizontal electric field and thus, to enable control of abnormal behavior such as horizontal distortion of liquid crystal molecules. Accordingly, it is possible to reduce the thickness of the liquid crystal layer that has been formed to have a sufficient thickness required to prevent effects due to the horizontal electric field.

In addition, in the present invention, the pretilt angle of 4 degrees or more is given such that the effect of the pretilt angle is greater than the effect of voltage driving (more particularly, the horizontal electric field). This is able to prevent horizontal distortion caused when voltage is applied and also, to prevent asymmetry of the electrically-driven liquid crystal lens.

As occasion demands, if the pretilt angle is given by UV alignment, the electrically-driven liquid crystal lens having symmetrical characteristics may be applied even when the pretilt angle is in a range of 0~0.5 degrees. In the above described case where the rubbing angle is 90 degrees and the pretilt angle is 1 degree, liquid crystal molecules are somewhat inclined with respect to a substrate surface and therefore, have a strong tendency to move according to whether or not voltage is applied. However, if the pretilt angle has a small value in a range of 0~0.5 degrees, alignment of liquid crystal molecules is achieved according to whether or not voltage is applied, rather than being affected by an initial alignment condition. In this case, since the rubbing direction is perpendicular to the longitudinal direction of the first electrodes, the liquid crystal molecules aligned horizontally parallel to the first electrodes become upright by a vertical electric field when transitioning from a no voltage state to a voltage applying state, enabling driving of the electrically-driven liquid crystal lens.

Figure 9:
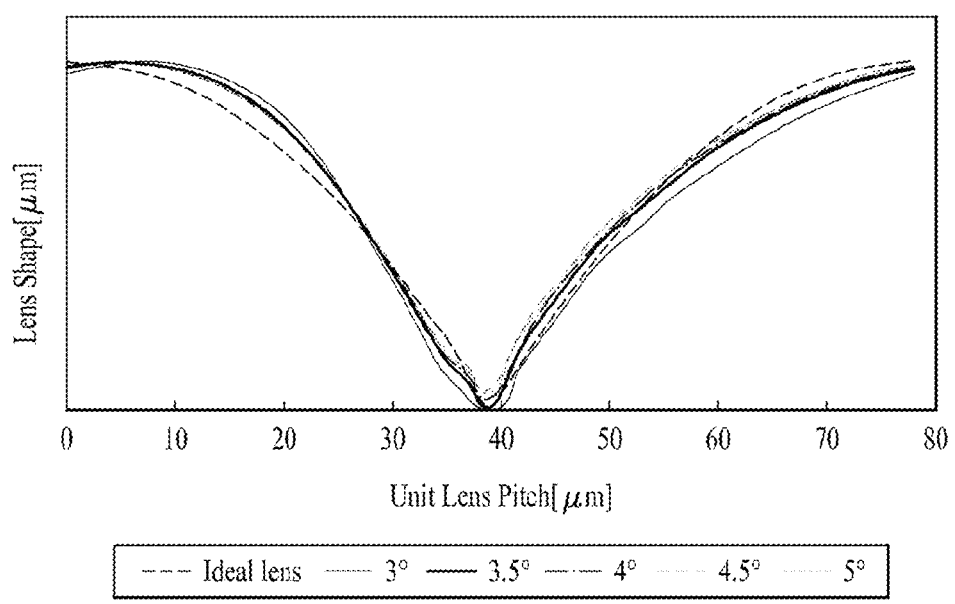
FIG. 9 is a view illustrating a lens shape based on variation in a pretilt angle.

FIG. 9 is a view illustrating a lens shape based on variation in the pretilt angle.

As will be appreciated from simulation results of FIG. 9, when the rubbing direction is perpendicular to the longitudinal direction of the electrode, as the pretilt angle increases to 4 degrees or more, the effect of the horizontal electric field decreases and thus, the resulting lens shape is further close to an ideal lens shape.

In the above simulation, the electrically-driven liquid crystal lens is realized under the condition that the rubbing direction is perpendicular to the longitudinal direction of the first electrode and the pretilt angle is increased stepwise by 0.5 degrees within a range of 3~5 degrees.

In this case, it can be appreciated that the electrically-driven liquid crystal lens has asymmetrical characteristics in that the lens heights at the left and right sides of the electrode slightly differ from each other when the pretilt angle is 3 or 3.5 degrees, whereas has symmetrical characteristics when the pretilt angle is 4 degrees.

The above described characteristics are not applicable only when the rubbing direction is perpendicular to the longitudinal direction of the electrode, and similar improvement effects may be obtained when the rubbing direction is in a range of 30~90 degrees with respect to the longitudinal direction of the electrode.

Hereinafter, a stereoscopic display device including the above described electrically-driven liquid crystal lens will be described.

Figure 10:
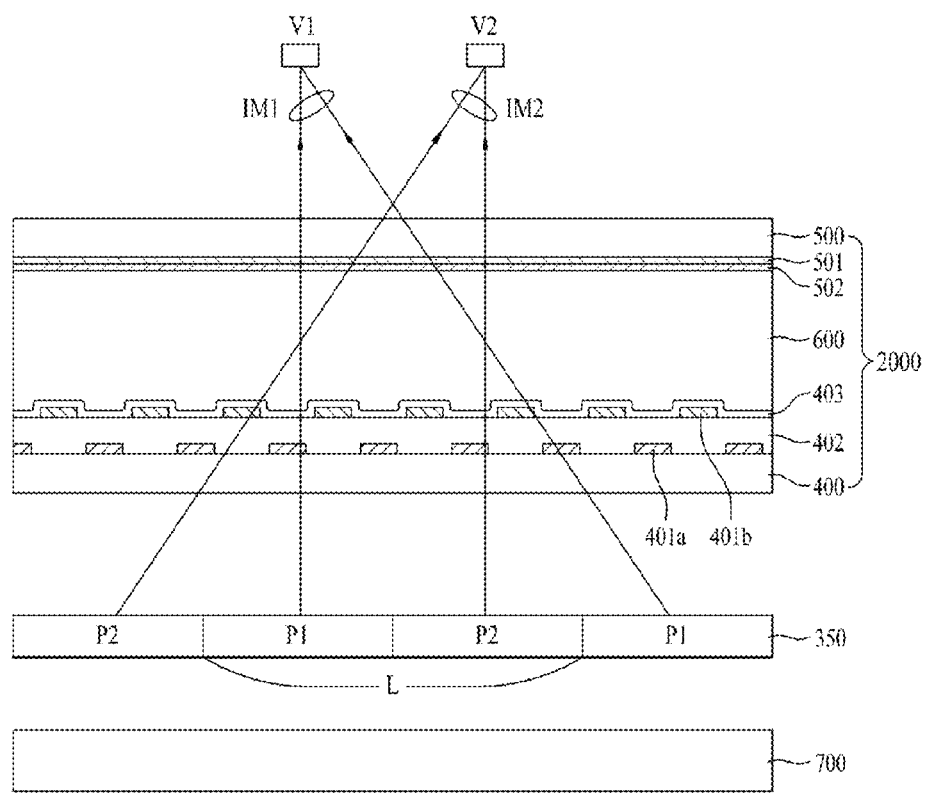
FIG. 10 is a sectional view illustrating a stereoscopic display device according to the present invention.

FIG. 10 is a sectional view illustrating the stereoscopic display device of the present invention.

In FIG. 10, the lens regions L are repeated in a horizontal direction, and the first electrodes 401a and 401b have an elongated bar shape extending in the direction into the drawing.

As illustrated in FIG. 10, the stereoscopic display device of the present invention includes the electrically-driven liquid crystal lens 2000, which is driven upon receiving voltages to thereby function as a lens, a display panel 350, which is disposed below the electrically-driven liquid crystal lens 2000 and serves to emit 2D image information, and a light source 700, which is disposed below the display panel 350 and serves to emit light to the display panel 350.

As occasion demands, if the display panel 350 is a self-illumination device, omission of the light source 700 is possible.

The display panel 350 contains first and second image pixels P1 and P2 alternately and repeatedly arranged to display first and second images IM1 and IM2, respectively. The display panel 350 may be selected from various flat-panel displays including a Liquid Crystal Display (LCD), Organic Light Emitting Display (OLED), Plasma Display Panel (PDP), Field Emission Display (FED), etc. The display panel 350 is located below the electrically-driven liquid crystal lens 2000, and serves to transmit a 2D image signal to the electrically-driven liquid crystal lens 2000.

The electrically-driven liquid crystal lens 2000 of the present invention functions to emit a 3D image signal from a 2D image signal according to the profile of a lens surface, and is located on the display panel 350 that forms a 2D image. The electrically-driven liquid crystal lens 2000 may selectively emit a 3D image signal or a 2D image signal according to whether or not voltage is applied thereto. Specifically, the electrically-driven liquid crystal lens 1000 has a switching function to display a 2D image when no voltage is applied, or a 3D image when voltage is applied.

In the meantime, when voltages, ranging from the above-described threshold voltage (i.e. AC square wave voltage having a peak value of 1.4~2V) to the highest voltage (i.e. AC square wave voltage having a peak value of 2.5~10V), are applied to the plurality of first electrodes 401a and 401b provided in the electrically-driven liquid crystal lens 2000 and a ground voltage is applied to the second electrode 501, the electrically-driven liquid crystal lens 2000 functions similar to an optical parabolic lens, thereby transmitting the first and second images IM1 and IM2 from the display panel 350 to first and second viewing zones V1 and V2, respectively. If a distance between the first viewing zone V1 and the second viewing zone V2 is set to a distance between the viewer's eyes, the viewer can combine the first and second images IM1 and IM2 transmitted to the first and second viewing zones V1 and V2, thereby perceiving a 3-dimensional image based on binocular disparity.

On the other hand, when no voltage is applied to the first electrodes 401a and 401b and the second electrode 501, the electrically-driven liquid crystal lens 2000 simply serves as a transparent layer to directly display the first and second images IM1 and IM2 of the display panel 350 without refraction. Accordingly, the first and second images IM1 and IM2 are directly transmitted to the viewer regardless of viewing zones and thus, the viewer perceives a 2-dimensional image.

In the drawing, one lens region L of the electrically-driven liquid crystal lens 2000 has a width corresponding to a total width of two pixels P1 and P2 of the display panel 350 located below the electrically-driven liquid crystal lens 2000. As occasion demands, a plurality of pixels may correspond to the lens region L. In addition, the lens regions L may be tilted at a predetermined angle with respect to the pixels and, as occasion demands, may be arranged stepwise with respect to the pixels (more particularly, the lens region of an $n^{th}$ pixel horizontal line is shifted from an $(n+1)^{th}$ pixel horizontal line by a predetermined distance).

The lens region L is defined to have a width corresponding to a pitch P, and the plurality of lens regions L with the same pitch is periodically repeated in a given direction (for example, in a horizontal direction as illustrated in FIG. 10). Here, "pitch P" means a horizontal width of a single lens region L. It is noted that the lens region L does not have a physical convex-lens shape, but has lens effects obtained when liquid crystals are aligned by an electric field. In FIG. 10, the above described lens regions L are horizontally repeated at an interval of a pitch P.

In the meantime, in the above described electrically-driven liquid crystal lens, the liquid crystal molecules forming the liquid crystal layer have positive dielectric anisotropy such that the liquid crystal molecules are aligned by the electric field so as to be perpendicular to the potential surface. If the liquid crystal molecules have negative dielectric anisotropy, alignment characteristics contrary to the above description may be achieved.

As apparent from the above description, an electrically-driven liquid crystal lens and a stereoscopic display device using the same according to the present invention have the following effects.

Firstly, to reduce a cell gap, finely split electrodes are provided and different voltages are applied to the respective electrodes. With this configuration, the electrically-driven liquid crystal lens may achieve an improved lens profile and reduced cell gap, resulting in a reduction in process costs.

Secondly, even if a horizontal electric field is created between the neighboring electrodes due to a voltage difference caused when a high voltage is applied to the center of each of the finely split electrodes, rubbing is performed in a direction in a range of 30~90 degrees with respect to a longitudinal direction of the finely split electrodes and thus, it is possible to prevent liquid crystal molecules from being horizontally distorted by the horizontal electric field.

Thirdly, since an alignment film has a pretilt angle in a range of 0~0.5 degrees or 4 degrees or more, it is possible to assure symmetry in the refractive index of a liquid crystal layer of the electrically-driven liquid crystal lens by eliminating the effect of the pretilt angle or increasing the effect of an electric field beyond the effect of the pretilt angle when transitioning from a no voltage state to a voltage applying state. In the latter case, as rubbing is performed in a direction approximately or exactly perpendicular to the longitudinal direction of the finely split electrodes via control of the pretilt angle of liquid crystal molecules, it is possible to control behavior of the liquid crystal molecules in a horizontal direction.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An electrically-driven liquid crystal lens comprising:
   a first substrate and a second substrate arranged opposite each other and each including a plurality of lens regions;
   a plurality of first electrodes formed on the first substrate in each lens region and spaced apart from one another in a given direction;
   a second electrode formed over the entire surface of the second substrate, wherein voltages gradually increasing from a center to an edge of each lens region are applied to the respective first electrodes and a ground voltage is applied to the second electrode when in a voltage applying state;
   a first alignment film formed over the entire surface of the first substrate including the first electrodes, the first alignment film being subjected to rubbing by an angle of 90 degree with respect to a longitudinal direction of the first electrodes and being aligned to have a pretilt angle in a range of 4-45 degrees; and
   a liquid crystal layer filled between the first substrate and the second substrate,
   wherein in the voltage applying state, liquid crystals of the liquid crystal layer are aligned in a direction substantially perpendicular to a potential surface, and an effect of the pretilt angle is greater than an effect of a horizontal electric field between the first electrodes.

2. The lens according to claim 1, wherein liquid crystals forming the liquid crystal layer have positive dielectric anisotropy.

3. The lens according to claim 1, further comprising a second alignment film on the second electrode.

4. The lens according to claim 3, wherein the second alignment film has a rubbing direction anti-parallel to a rubbing direction of the first alignment film.

5. The lens according to claim 1, wherein in the voltage applying state, the liquid crystals are asymmetrically aligned on the basis of a center of the one of the first electrodes to which a highest voltage is applied.

6. A stereoscopic display device comprising:
   a display panel to emit a 2-dimensional (2D) image signal; and
   an electrically-driven liquid crystal lens which directly emits the 2D image signal from the display panel, or converts the 2D image signal into a 3-dimensional (3D) image signal to thereby emit the 3D image signal, the electrically-driven liquid crystal lens including:

a first substrate and a second substrate arranged opposite each other and each including a plurality of lens regions;

a plurality of first electrodes formed on the first substrate in each lens region and spaced apart from one another in a given direction;

a second electrode formed over the entire surface of the second substrate, wherein the stereoscopic display device is configured to apply voltages gradually increasing from a center to an edge of each lens region to the respective first electrodes and a ground voltage to the second electrode when in a voltage applying state;

a first alignment film formed over the entire surface of the first substrate including the first electrodes, the first alignment film being subjected to rubbing by an angle of 90 degree with respect to a longitudinal direction of the first electrodes and being aligned to have a pretilt angle in a range of 4-45 degrees; and a liquid crystal layer filled between the first substrate and the second substrate, wherein in the voltage applying state, liquid crystals of the liquid crystal layer are aligned in a direction substantially perpendicular to a potential surface, and an effect of the pretilt angle is greater than an effect of a horizontal electric field between the first electrodes.

7. The device according to claim 6, wherein a transmission axis of polarized light is identical to a rubbing direction of the first alignment film included in the electrically-driven liquid crystal lens when the polarized light is transmitted from the display panel to the electrically-driven liquid crystal lens.

8. The device according to claim 6, wherein in the voltage applying state, the liquid crystals are asymmetrically aligned on the basis of a center of the one of the first electrodes to which a highest voltage is applied.

* * * * *